United States Patent
Vaden et al.

(10) Patent No.: US 7,788,513 B2
(45) Date of Patent: Aug. 31, 2010

(54) METHOD OF REDUCING POWER CONSUMPTION OF A COMPUTING SYSTEM BY EVACUATING SELECTIVE PLATFORM MEMORY COMPONENTS THEREOF

(75) Inventors: Thomas L. Vaden, Neshanic Station, NJ (US); Martin Goldstein, Campbell, CA (US); Carey Huscroft, Davis, CA (US); Christopher Gregory Malone, Loomis, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 892 days.

(21) Appl. No.: 11/511,605

(22) Filed: Aug. 29, 2006

(65) Prior Publication Data

US 2008/0059820 A1 Mar. 6, 2008

(51) Int. Cl.
*G06F 1/26* (2006.01)
*G06F 1/00* (2006.01)
*G06F 12/00* (2006.01)
*G06F 15/00* (2006.01)
*G11C 5/14* (2006.01)

(52) U.S. Cl. .............. 713/320; 713/324; 711/147; 711/170; 712/28; 365/226; 365/227

(58) Field of Classification Search .......... 713/320, 713/324; 711/147, 170; 712/28; 365/226, 365/227

See application file for complete search history.

(56) References Cited

U.S. PATENT DOCUMENTS

| | | | |
|---|---|---|---|
| 5,524,248 A * | 6/1996 | Parks et al. | 713/324 |
| 6,330,639 B1 * | 12/2001 | Fanning et al. | 711/106 |
| 6,742,097 B2 * | 5/2004 | Woo et al. | 711/170 |
| 7,028,200 B2 | 4/2006 | Ma | |
| 7,272,734 B2 * | 9/2007 | Gooding | 713/320 |
| 7,421,598 B2 * | 9/2008 | Brittain et al. | 713/320 |
| 2004/0268031 A1 | 12/2004 | Lawrence | |
| 2004/0268121 A1 | 12/2004 | Shelest et al. | |
| 2004/0268166 A1 | 12/2004 | Farkas et al. | |
| 2006/0005057 A1 | 1/2006 | Nalawadi et al. | |
| 2006/0010283 A1 | 1/2006 | Ono | |
| 2006/0047493 A1 | 3/2006 | Gooding | |
| 2006/0117160 A1 | 6/2006 | Jackson et al. | |
| 2006/0136767 A1 | 6/2006 | Ma | |
| 2008/0005516 A1 * | 1/2008 | Meinschein et al. | 711/165 |
| 2008/0313482 A1 * | 12/2008 | Karlapalem et al. | 713/324 |

* cited by examiner

*Primary Examiner*—Stefan Stoynov

(57) ABSTRACT

A method of reducing power consumption of a computing system by a predetermined amount comprises: selecting at least one memory component of the computer system for reduced power consumption based on the predetermined amount of power consumption reduction; and evacuating the selected at least one memory component to reduce the power consumption of the computing system by at least the predetermined amount.

20 Claims, 11 Drawing Sheets

| | | | | |
|---|---|---|---|---|
| 2 | 1 | 0 | 2 | DIMM 5 |
| 1 | 0 | 2 | 1 | DIMM 4 |
| 0 | 2 | 1 | 0 | DIMM 3 |
| 2 | 1 | 0 | 2 | DIMM 2 |
| 1 | 0 | 2 | 1 | DIMM 1 |
| 0 | 2 | 1 | 0 | DIMM 0 |

DIMM 0: u 0 u 2 u u 1 u u 0 u
DIMM 1: 1 u u 0 u u 2 u u 1 u
DIMM 2: u 2 u u 1 u u 0 2 u
DIMM 3: u 0 u 2 1 u u 0
DIMM 4: 1 0 2 1
DIMM 5: 2 1 0 2

METHOD OF REDUCING POWER CONSUMPTION OF A COMPUTING SYSTEM BY EVACUATING SELECTIVE PLATFORM MEMORY COMPONENTS THEREOF

BACKGROUND

A computing system, like a server, for example, generally comprises at least one central processing unit (CPU) and a memory subsystem including a plurality of platform memory components which may be dual in-line memory modules (DIMMs), for example. Most modern servers comprise multiple processing units which share or interleave their respective memory usage among the plurality of DIMMs. In a data center, there may be a multiplicity of computing systems or servers. The memory subsystems of these computing systems consume a significant portion of the overall power of the data center. Power consumption of a data center is usually controlled by a data center manager via the operating systems of the various data center computing systems.

From time to time, a reduction in power consumption to a computing system of the center is required. The reasons for the power reduction are varied. For example, a data center may be on a power consumption budget. If a current power usage is predicted to exceed the designated power budget, the data center manager may issue commands to reduce power consumption of one or more computing systems of the center. Another possibility may be as a result of power consumption creating excessive heating in the computing system. A reduction in power consumption to one or more of the computing systems may be used as a technique to reduce the heating of the system equipment to meet a thermal budget.

If power reduction to a computing system of the center is deemed necessary, there may be only a single choice between running the server which will continue to consume the power required for total use of system memory or turning the server and its respective memory subsystem completely off to achieve the desired reduction in power consumption. More than likely, when all other means of power reduction are not sufficient, the computing system will be turned off. While this maneuver achieves the goal of power reduction, it severely and adversely affects the computing performance of the overall center. Accordingly, it is desirable to find a way to reduce power consumption of a computing system without completely eliminating it as a computing resource of the data center.

SUMMARY

In accordance with one aspect of the present invention, a method of reducing power consumption of a computing system by a predetermined amount comprises: selecting at least one memory component of the computer system for reduced power consumption based on the predetermined amount of power consumption reduction; and evacuating the selected at least one memory component to reduce the power consumption of the computing system by at least the predetermined amount.

BRIEF DESCRIPTION OF THE DRAWINGS

FIG. 2 is a diagram of an exemplary mapping of the memory components of the computing system.

FIG. 6 is a mapping diagram of the memory components of the computing system illustrating a resulting relocation of memory usage from the selected, evacuated memory components into unselected memory components.

DETAILED DESCRIPTION OF THE INVENTION

Figure 1:
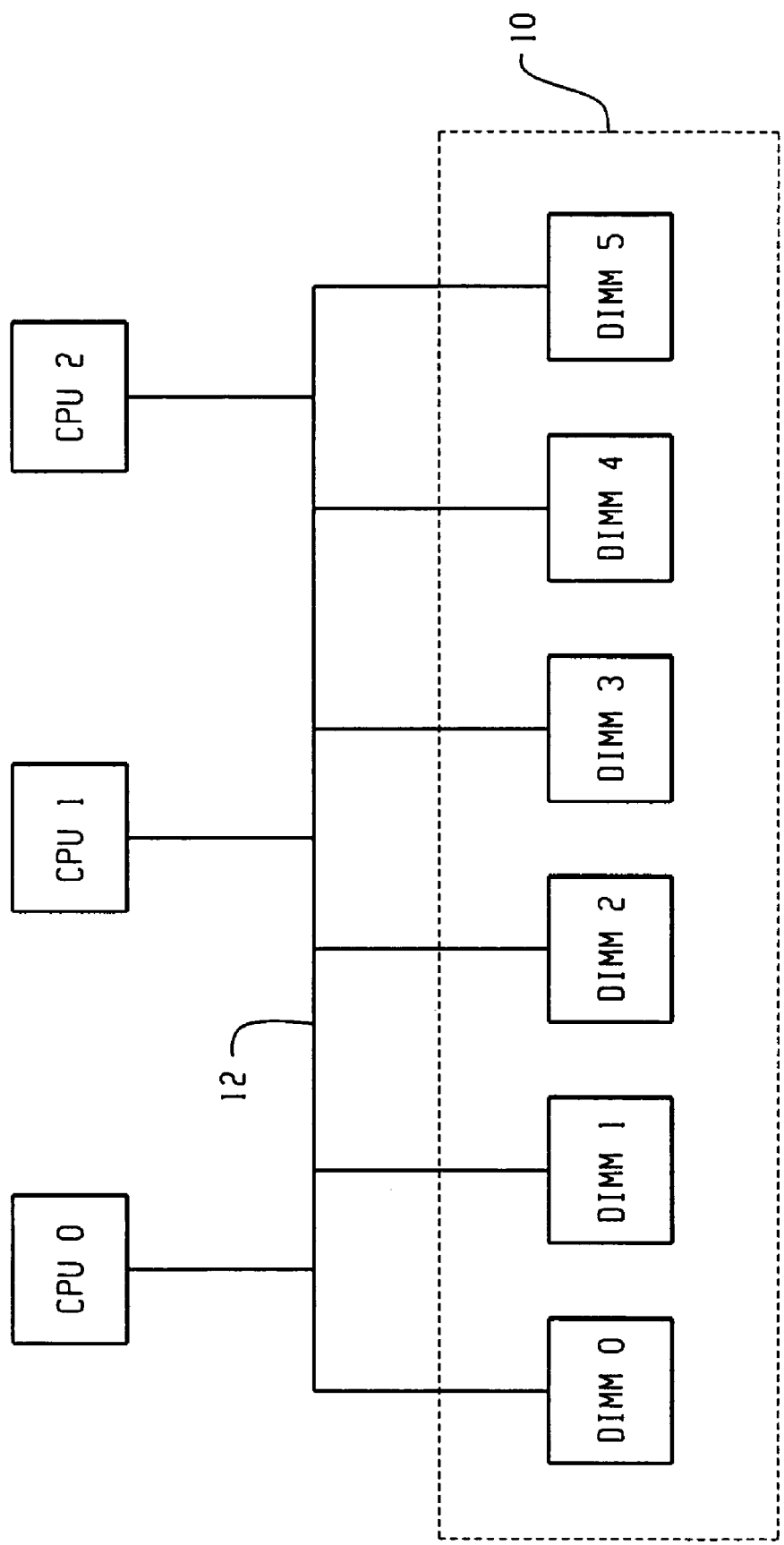
FIG. 1 is a block diagram schematic of an exemplary multi-processor computing system comprising a plurality of memory components.

An example of a multi-processor computing system is shown in the block diagram schematic of FIG. 1. Referring to FIG. 1, the example system comprises a plurality of central processing units, CPU 0, CPU 1 and CPU 2 and a memory subsystem 10 which may include a plurality of platform memory components which may be dual in-line memory modules DIMM 0 through DIMM 5, for example. Each of the CPUs 0, 1 and 2 may be of the Itanium® processor family manufactured by Intel Corp. and each of the DIMMs 0-5 may be of the two(2) gigabyte type manufactured by Qimonda, bearing model no. DDR2, for example. In the present example, the CPUs 0, 1 and 2 may be coupled to the DIMMs 0-5 of the memory subsystem 10 through a shared system bus 12. The CPUs 0, 1 and 2 are controlled either by individual CPU resident operating systems, by a common shared operating system or both.

Generally, operating systems map out the use of memory for the CPUs to maximize performance which results in operating systems having logical boundaries that may not be coincident with the physical boundaries of the memory components. In some configurations, the operating system may explicitly interleave memory usage among the memory components in order to ensure a logically contiguous memory mapped across a number of memory components. Accordingly, memory usage for each CPU 0, 1 and 2 may be assigned by the appropriate operating system among the DIMMs 0-5 in an interleaved manner as will become better understood from the following description.

FIG. 2 is a block diagram schematic of a memory mapping of the DIMMs 0-5 exemplifying an interleaved memory assignment for the CPUs 0, 1 and 2 among the DIMMs 0-5. Referring to FIG. 2, each of the DIMMs 0-5 are depicted as being divided into four (4) blocks of memory with each block being assigned to one of the CPUs 0, 1 and 2. For example, in DIMM 0, the top and bottom blocks of memory are assigned to CPU 0; the top and bottom middle blocks are assigned to CPU 2 and CPU 1, respectively. In DIMM 1, the top and bottom blocks of memory are assigned to CPU 1; the top and bottom middle blocks are assigned to CPU 0 and CPU 2, respectively. In DIMM 2, the top and bottom blocks of memory are assigned to CPU 2; the top and bottom middle blocks are assigned to CPU 1 and CPU 0, respectively. The memory blocks of DIMMs 3-5 are assigned in a similar manner as DIMMs 0-2 shown in the example of FIG. 2.

Figure 3:
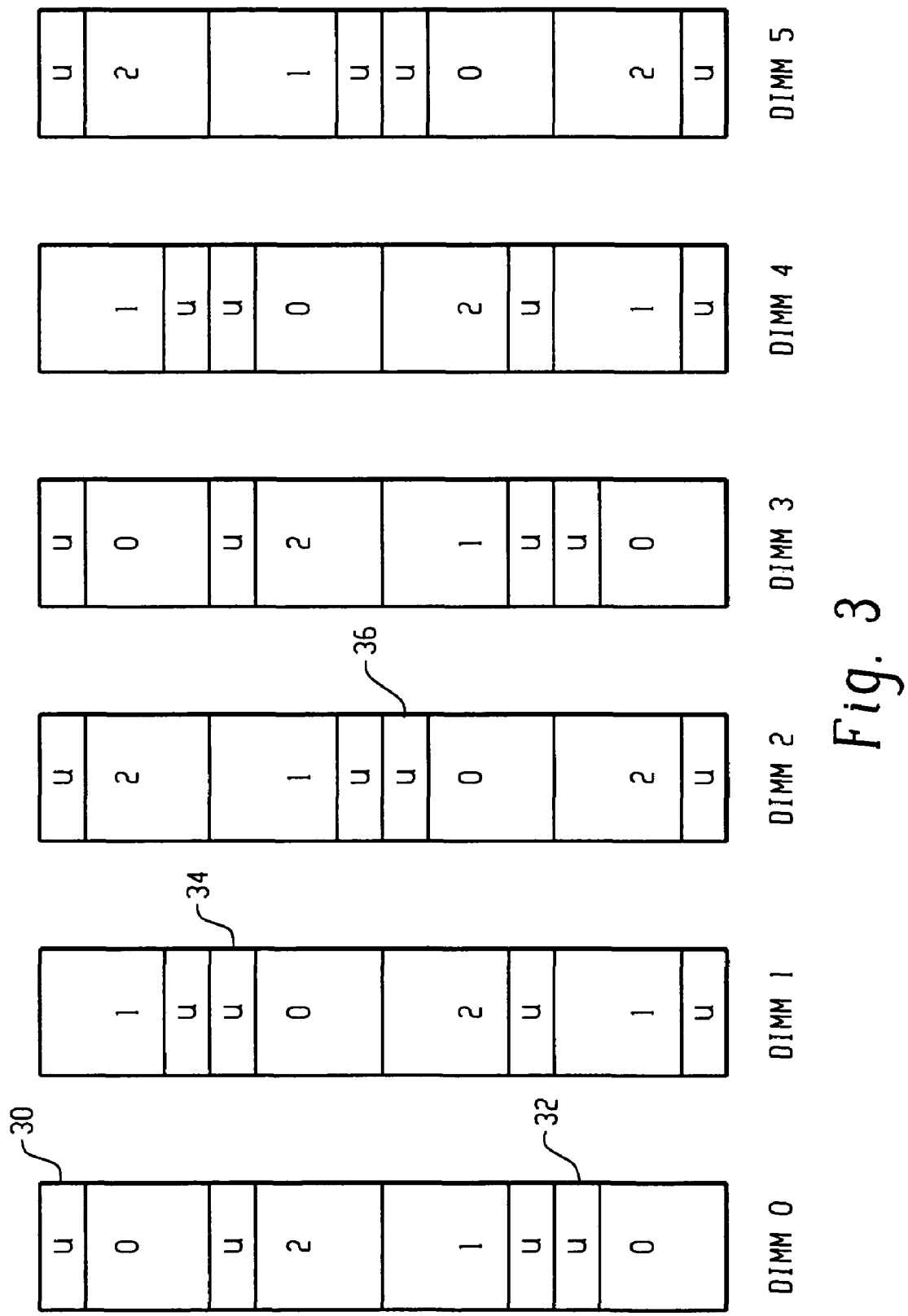
FIG. 3 is a mapping diagram exemplifying an interleaved usage of the memory components by the multi-processor computing system.

During the operation of the exemplary computing system, each of the CPUs 0, 1 and 2 use portions of their assigned blocks of memory among the DIMMs 0-5 for storage. FIG. 3 is a memory mapping exemplifying an interleaved memory usage of the CPUs 0, 1 and 2 among their assigned memory blocks of the DIMMs 0-5. In FIG. 3, the memory portions being used are designated by a "u". For example, CPU 0 is using top portions 30 and 32 of the top and bottom memory blocks of DIMM 0, top portion 34 of the top middle block of DIMM 1, and top portion 36 of the bottom middle block of DIMM 2. CPU 0 is also using similar portions of its assigned memory blocks of DIMMs 3-5. Memory portions being used by the other CPUs 1 and 2 are similarly shown in the example of FIG. 3 by a "u" designation.

In order to have the memory components, DIMMs 0-5, for example, be used to achieve a reduction in power consumption of the computing system, power to selected memory components may be substantially reduced or eliminated. In a conventional interleaved memory usage situation, the operating system may not simply prevent the use of a logical block of memory to reduce power consumption of the system. Accordingly, in order to properly reduce power consumption of the computing system, the operating system should perform the following steps: (1) break any logical memory scattering or interleaving currently mapped by the operating system; (2) select a particular memory component or set of memory components for reduced power consumption; and (3) remap a logical memory image (mapping) from the operating system on to a physical memory that omits the particular memory component or components from use thereby.

Figure 4:
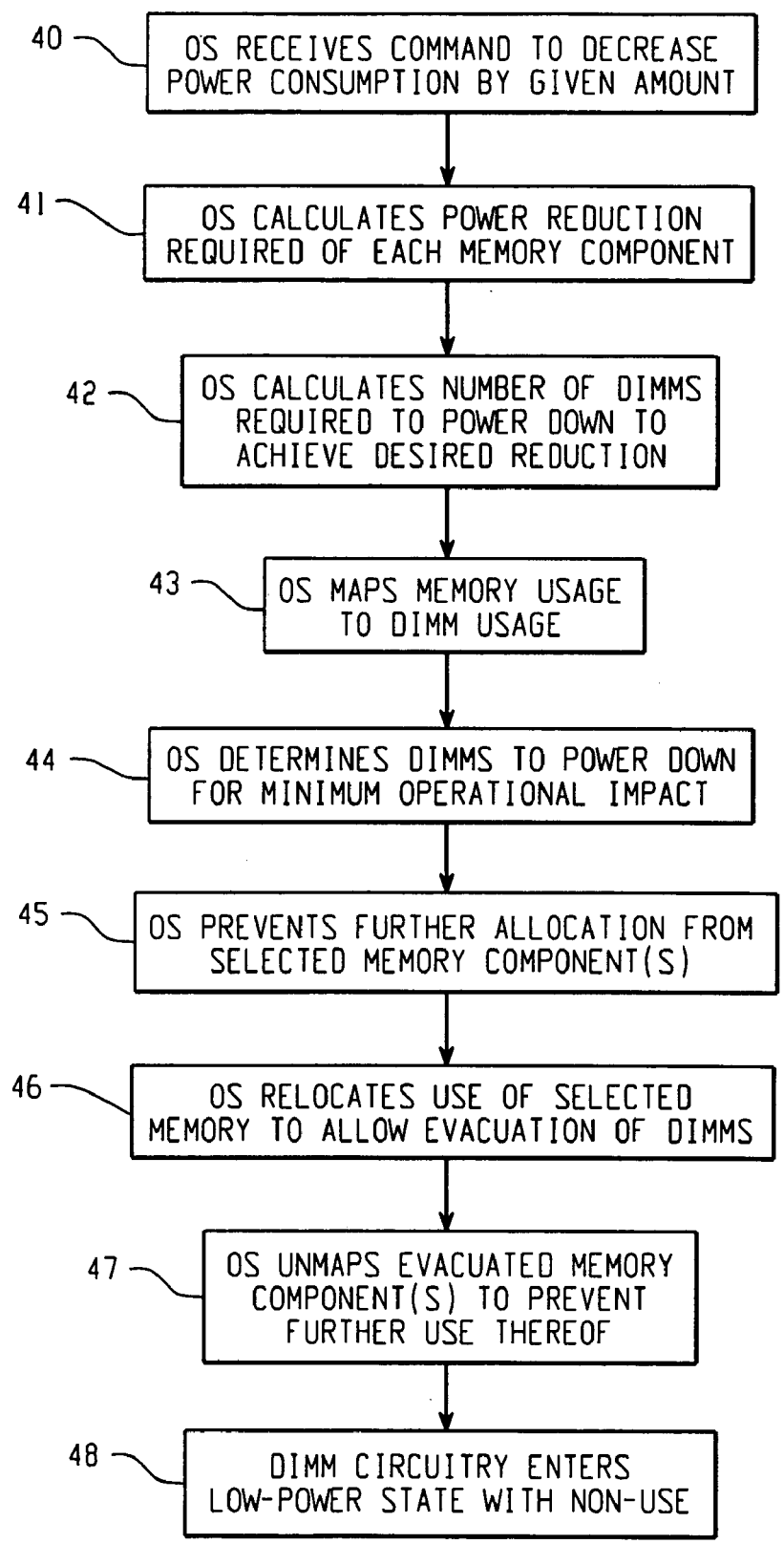
FIG. 4 is a flowchart of an exemplary method of reducing power consumption of the computing system by evacuating selective memory components thereof.

FIG. 4 is a flow chart of an exemplary method for reducing power consumption of a computing system according to the aforementioned steps by evacuating selective platform memory components or DIMMs thereof. Each of the blocks of FIG. 4 represents one or more steps of the method. Referring to FIG. 4, in step 40, the appropriate operating system of the CPUs 0, 1 and 2 receives a command to decrease power consumption by a given amount. The command may come from a data center manager, for example, but it is understood that other sources of the command are possible. In block 41, the operating system which may be a HP-UX system, for example, calculates the power reduction required of the memory components or DIMMs, and in block 42, the operating system calculates the number of memory components or DIMMs to be individually powered down to achieve the given amount of power reduction. Subsequently, in block 43, the operating system maps memory usage to DIMM usage in the memory subsystem 10, and then, in block 44, selects or determines which DIMMs of the memory subsystem 10 may be powered down to achieve the desired power reduction, preferably with minimum operational impact on the CPUs 0, 1 and 2. In block 45, the operating system prevents further allocation of memory usage from the identified or selected memory components.

Figure 5:
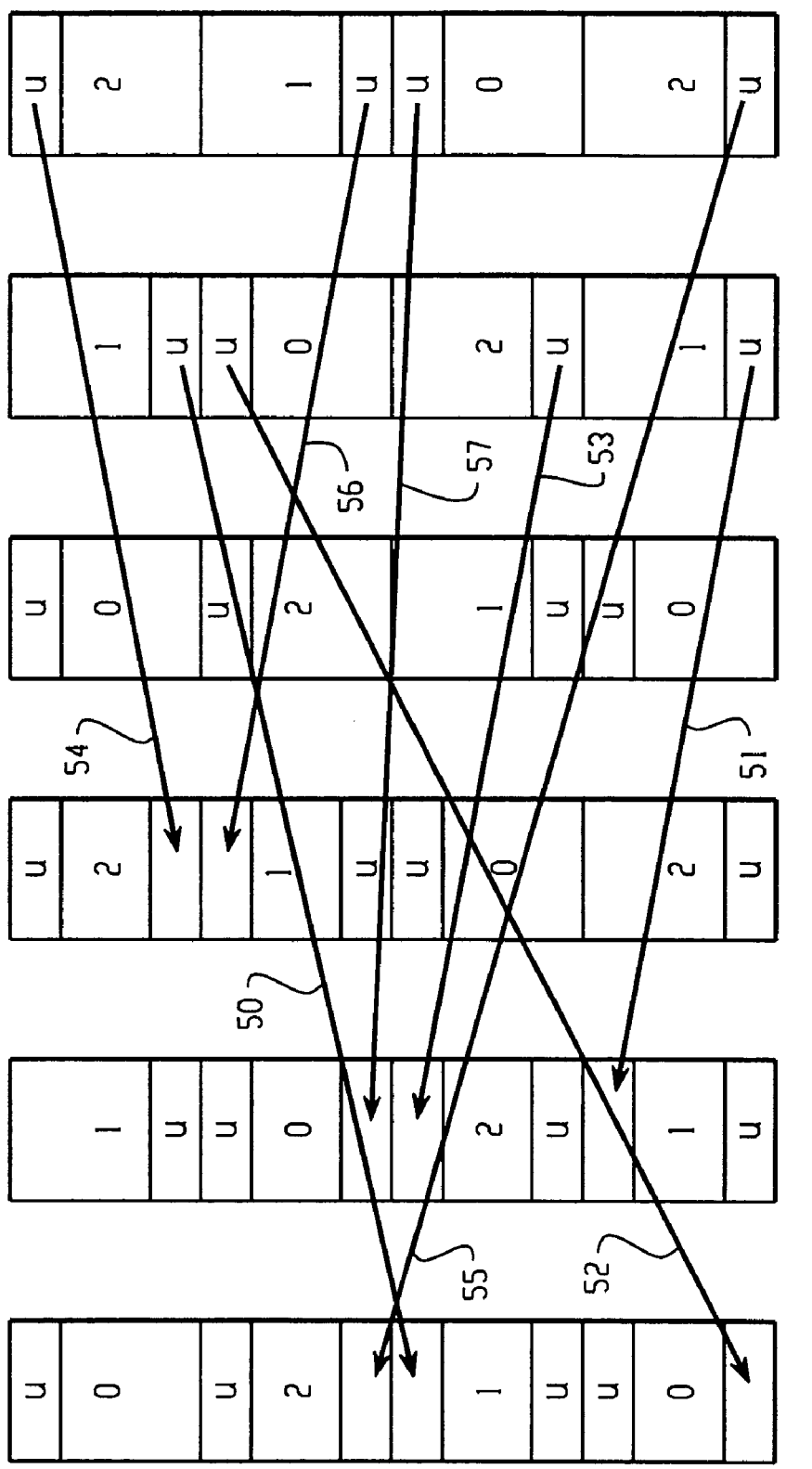
FIG. 5 is a mapping diagram of the memory components of the computing system illustrating an evacuation of selected memory components.

Still referring to FIG. 4, after step 45, the operating system relocates use of the used portions of the selected memory components to unused portions of the unselected memory components to perform an uninterleaving, unmapping and evacuation of the selected DIMMs in block 46. This process, which may be considered a partial evacuation of the memory subsystem 10, is shown by way of example in memory mapping of FIG. 5. In the example of FIG. 5, DIMMs 4 and 5 have been selected for powering down in block 44 to meet the power reduction target. Referring to FIG. 5, starting with DIMM 4, the used portions of the top and bottom memory blocks, which have been assigned to CPU 1, are relocated by the operating system to a top portion of the bottom middle memory block of DIMM 0 as designated by the arrowed line 50 and a top portion of the bottom memory block of DIMM 1 as designated by the arrowed line 51, respectively. Also in DIMM 4, the used portion of the top middle memory block, which has been assigned to CPU 0, is relocated to a bottom portion of the bottom memory block of DIMM 0 as designated by the arrowed line 52. Finally in DIMM 4, the used portion of the bottom middle memory block, which has been assigned to CPU 2, is relocated to a top portion of the bottom middle memory block of DIMM 1 as designated by the arrowed line 53.

Now, for DIMM 5, the used portions of the top and bottom memory blocks, which have been assigned to CPU 2, are relocated by the operating system to a bottom portion of the top memory block of DIMM 2 as designated by the arrowed line 54 and a bottom portion of the top middle memory block of DIMM 0 as designated by the arrowed line 55, respectively. Also in DIMM 5, the used portion of the top middle memory block, which has been assigned to CPU 1, is relocated to a top portion of the top middle memory block of DIMM 2 as designated by the arrowed line 56. Finally in DIMM 5, the used portion of the bottom middle memory block, which has been assigned to CPU 0, is relocated to a bottom portion of the top middle memory block of DIMM 1 as designated by the arrowed line 57. The resulting evacuation of the selected memory components DIMMs 4 and 5 and the relocation of memory usage thereof into the unselected memory components DIMMs 0-3 is shown in the memory mapping of FIG. 6.

Figure 7:
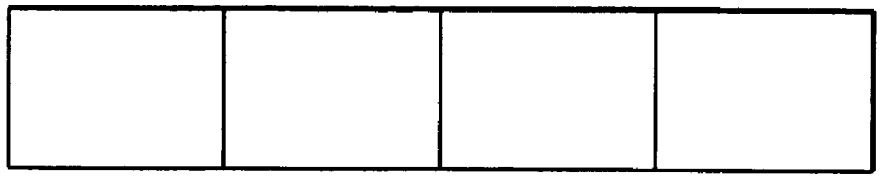
FIG. 7 is a mapping diagram of the memory components of the computing system illustrating an unmapping of the evacuated memory components.
Figure 7:
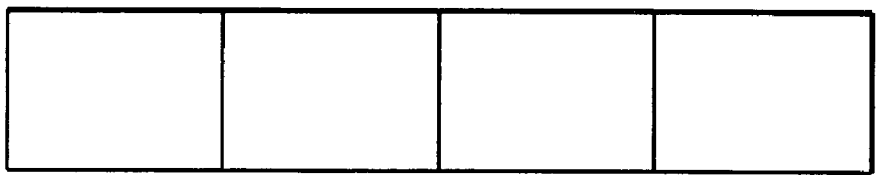
Figure 7:
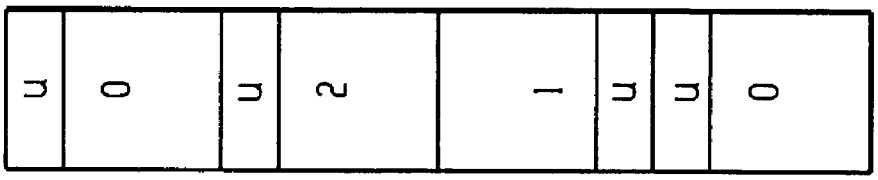
Figure 7:
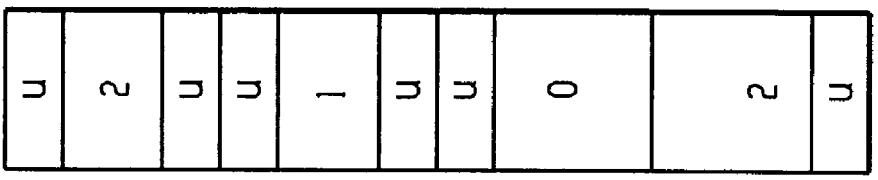
Figure 7:
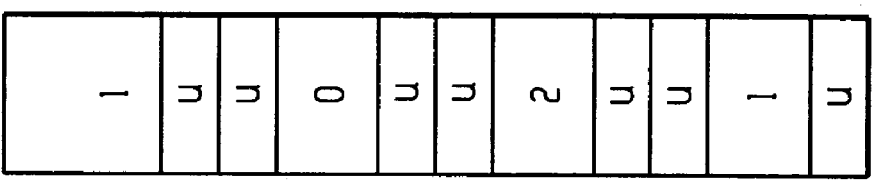
Figure 7:
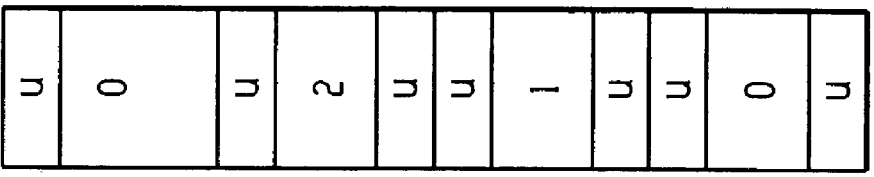

Referring back to the flowchart of FIG. 4, in block 47, the operating system unmaps the evacuated memory components, which are DIMMs 4 and 5 in the present example, to prevent any future use thereof. The memory mapping of FIG. 7 depicts the resulting unmapping of the evacuated memory components or DIMMs 4 and 5. Thereafter, in block 48 of the flowchart, the circuitry of the evacuated memory components enters into a low power state with non-usage, thus rendering the desired reduction in power consumption of the computer system.

Figure 8:
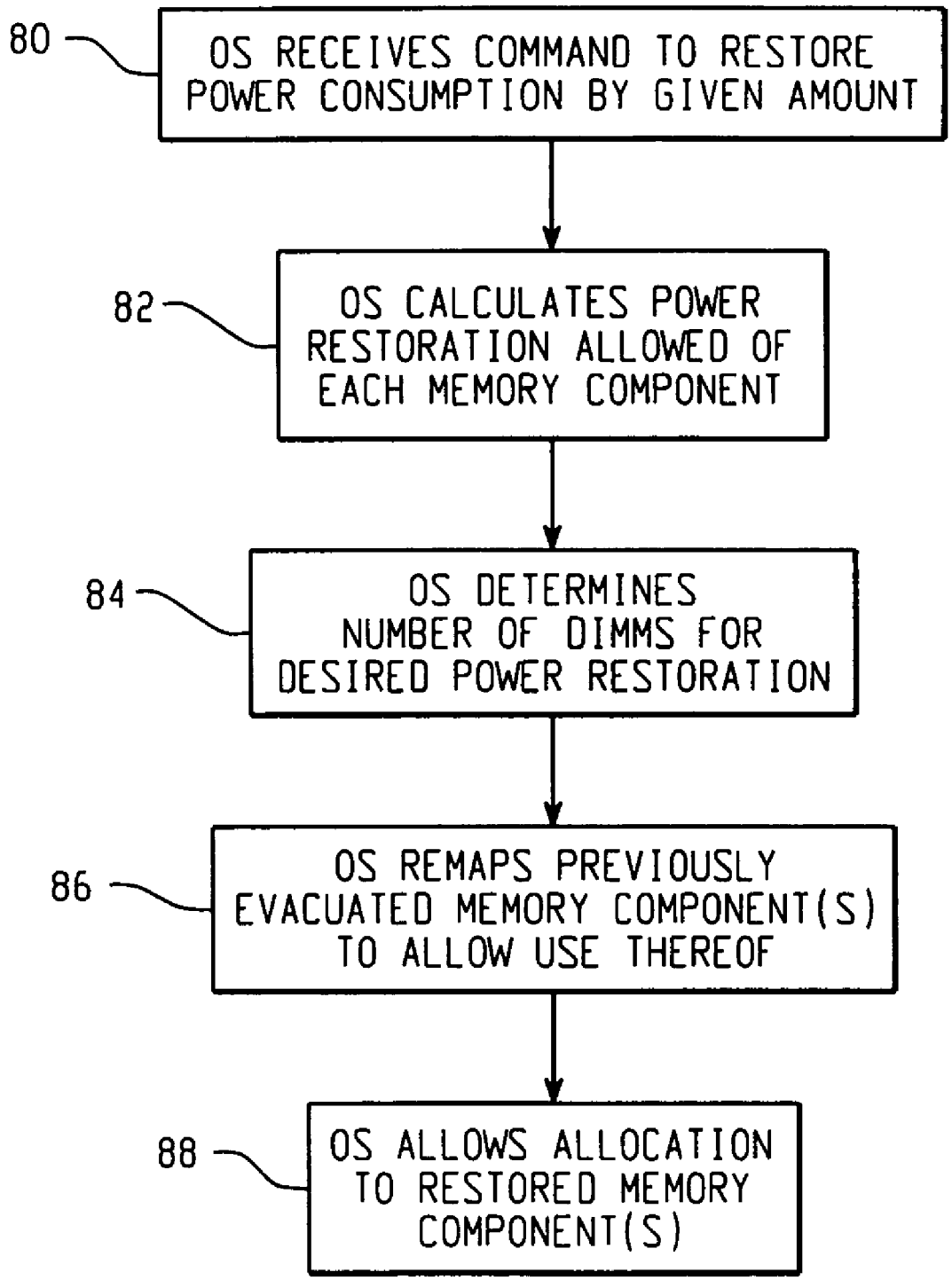
FIG. 8 is a flowchart of an exemplary method of restoring power consumption to the computing system.

Power consumption restoration to the computer system may be accomplished by a method exemplified by the flowchart of FIG. 8. The blocks of the flowchart represent one or more steps of the restoration method. Referring to FIG. 8, in block 80, the operating system may receive a command to restore an allowed or given amount of power consumption by the computing system. After receiving such a command, the operating system calculates the power restoration allowed of each evacuated memory component or DIMM in block 82. Then, in block 84, the operating system calculates the number of memory components which may be powered up to achieve the allowed restoration of power consumption and selects one or more of the previously evacuated memory components accordingly. In the present example, DIMM 4 is selected to meet the allowed restoration of power consumption.

In block 86, the operating system remaps the memory component(s) selected for restoration to permit usage thereof.

Figure 9:
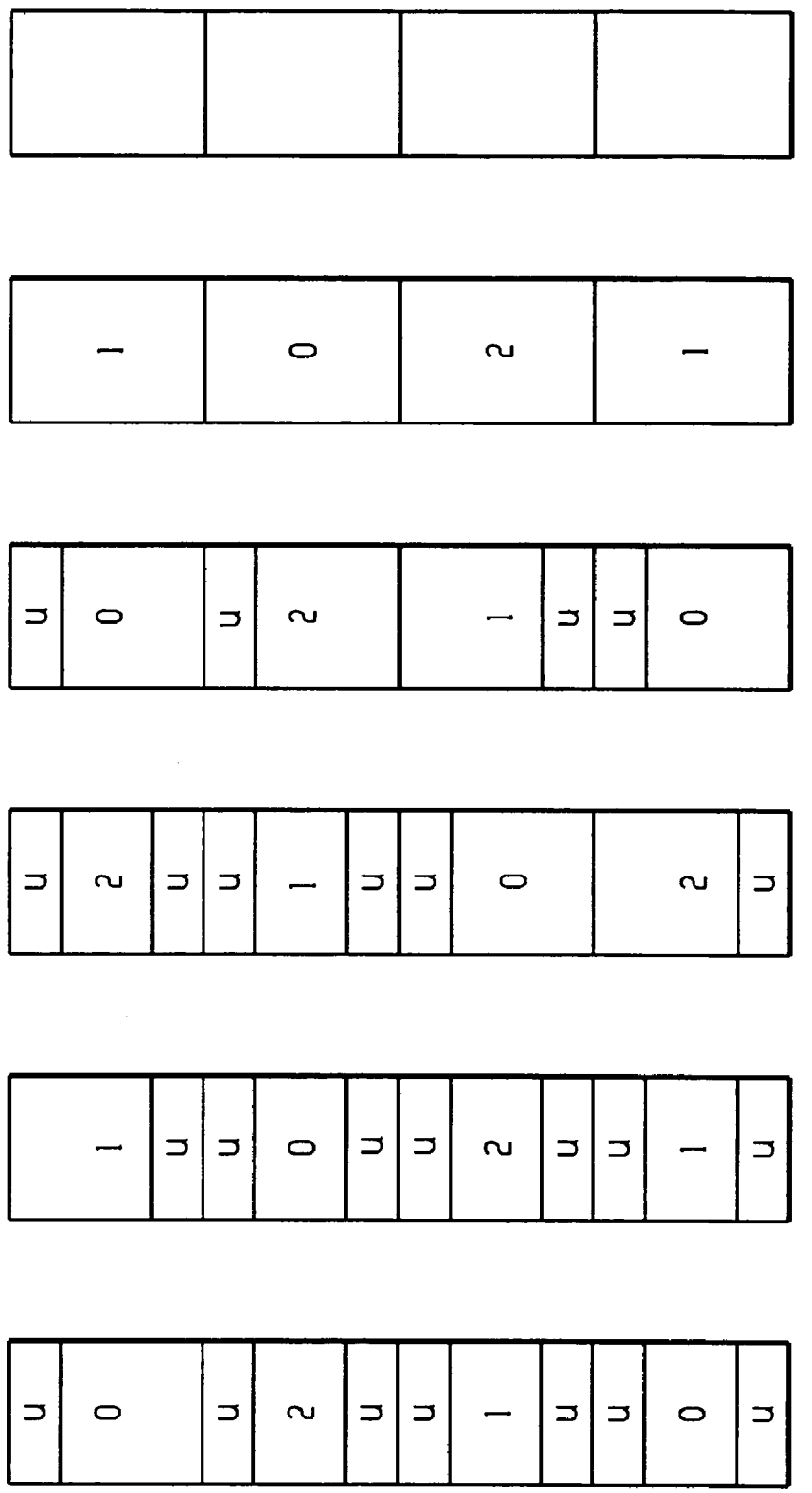
FIG. 9 is a mapping diagram of the memory components of the computing system illustrating a remapping and reinterleaving of a restored memory component.

The memory mapping of FIG. 9 exemplifies a remapping and reinterleaving of the restored memory component DIMM 4. Referring to FIG. 9, the top and bottom memory blocks of DIMM 4 are assigned to CPU 1, the top middle memory block is assigned to CPU 0, and the bottom middle memory block is assigned to CPU 2. In block 88 of the flowchart of FIG. 8, the operating system allows allocation of memory usage from the other memory components DIMMs 0-3 into the restored memory component which is DIMM 4 in the present example. The memory mapping of FIG. 10 exemplifies such a memory usage allocation after restoration.

Figure 10:
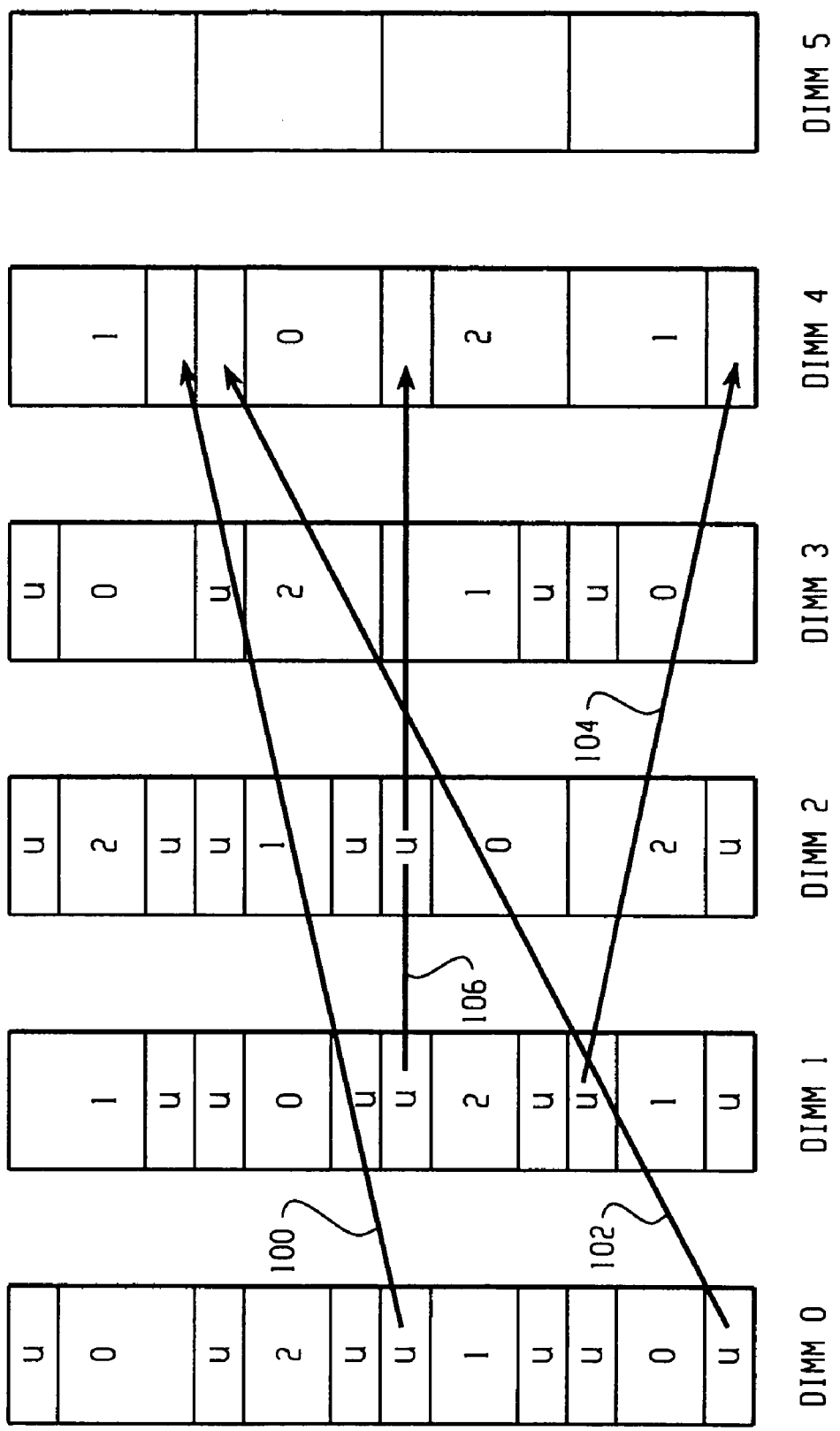
FIG. 10 is a mapping diagram of the memory components of the computing system illustrating an allocation of memory usage into the restored memory component.
Figure 11:
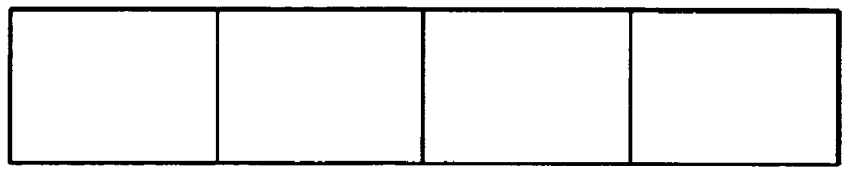
FIG. 11 is a mapping diagram of the memory components of the computing system illustrating a resulting memory usage after restoration and allocation of the memory component.
Figure 11:
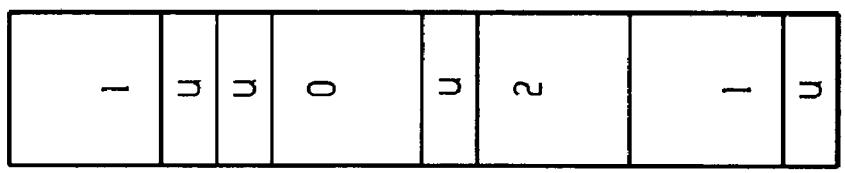
Figure 11:
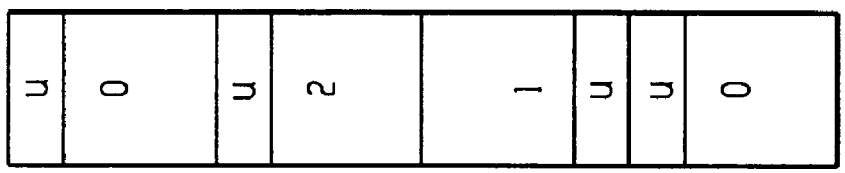
Figure 11:
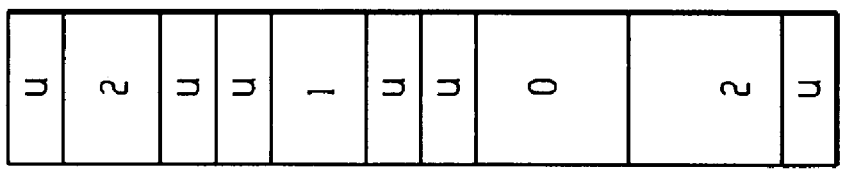
Figure 11:
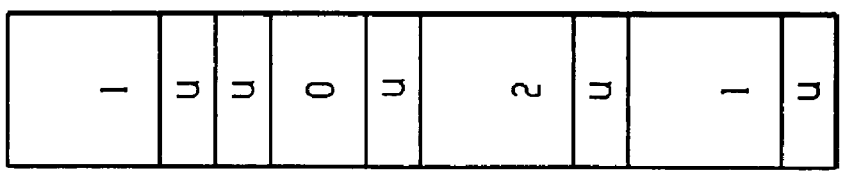
Figure 11:
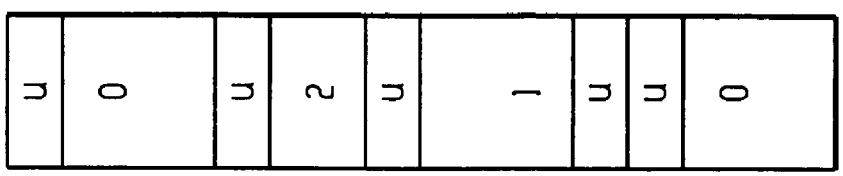

Referring to FIG. 10, CPU 1 memory usage from the bottom middle memory block in DIMM 0 is allocated as designated by the arrowed line 100 to a bottom portion of the top memory block which has been assigned to CPU 1; CPU 0 memory usage from the bottom memory block in DIMM 0 is allocated as designated by the arrowed line 102 to a top portion of the top middle memory block which has been assigned to CPU 0; CPU 1 memory usage from the bottom memory block in DIMM 1 is allocated as designated by the arrowed line 104 to a bottom portion of the bottom memory block which has been assigned to CPU 1; and CPU 2 memory usage from the bottom middle memory block in DIMM 1 is allocated as designated by the arrowed line 106 to a top portion of the bottom middle memory block which has been assigned to CPU 2. The resulting memory usage after restoration and allocation is shown in the exemplified memory mapping of FIG. 11.

The foregoing described method provides a mechanism for total evacuation of selected memory components by an operating system to achieve a desired reduction in power consumption of a computing system. Once totally evacuated, the selected memory component(s) will no longer consume a substantial amount of power. Accordingly, a controlled and significant reduction in power consumption of the computing system may be achieved while allowing the computing system to perform at a degraded, but predictable level. Power to the computing system may be restored in a controlled manner by returning selected memory components to service. Thus, data center managers will have better control over power reduction without completely eliminating a computing resource, but rather allowing the computing resources to operate in a degraded mode. Also, selectively reducing and restoring power in the foregoing described manner provides power control flexibility in a spectrum of performance rather than simply an "all on" or "all off" choice.

While the present invention has been described herein above in connection with one or more embodiments, it is understood that such presentation is provide merely by way of example without intent of limiting the invention in any way. Accordingly, the present invention should not be limited by the above presentation, but rather construed in breadth and broad scope in accordance with the recitation of the appended claims.

What is claimed is:

1. A method comprising:
   receiving an indication of a command to reduce power consumption of a computing system by a predetermined amount;
   in response to the indication, determining a number of memory components of the computer system to be powered down to achieve the predetermined amount of power consumption reduction;
   selecting at least one of the memory components of the computer system for reduced power consumption based on the determination; and
   evacuating said selected at least one memory component to reduce the power consumption of the computing system by at least said predetermined amount.

2. The method of claim 1 wherein the step of selecting includes:
   calculating a reduction of power consumption of each of a plurality of memory components of the computing system; and
   determining at least one memory component of said plurality for reduction of power consumption to meet said predetermined amount of reduced power consumption.

3. The method of claim 2 including:
   determining at least one memory component of said plurality for reduction of power consumption to meet said predetermined amount of reduced power consumption with a minimum of operational impact on the computing system.

4. The method of claim 1 wherein the step of evacuating includes relocating memory usage of the selected at least one memory component to other memory components of the computing system.

5. The method of claim 4 including preventing allocation of memory usage of the selected at least one memory component.

6. The method of claim 4 including uninterleaving and unmapping the evacuated at least one memory component to prevent memory usage thereof.

7. The method of claim 6 including rendering the uninterleaved, unmapped, and evacuated at least one memory component to a low power consumption state.

8. The method of claim 1 including receiving a command to reduce power consumption by the predetermined amount.

9. A method comprising:
   receiving an indication of a command to restore power consumption of a computing system by a predetermined amount;
   in response to the indication, determining a number of memory components of the computer system to be powered up to achieve the predetermined amount of power consumption restoration;
   selecting at least one of the memory components of the computer system for increased power consumption based on the determination; and
   allocating memory usage to said selected at least one memory component to restore the power consumption of the computing system by at least said predetermined amount.

10. The method of claim 9 wherein the step of selecting includes:
    calculating an increase of power consumption of each of a plurality of memory components of the computing system; and
    determining at least one memory component of said plurality for restoration of power consumption to meet said predetermined amount of power consumption restoration.

11. The method of claim 9 including remapping and reinterleaving the selected at least one memory component prior to the step of allocating.

12. The method of claim 11 including rendering the remapped, allocated at least one memory component to a higher power consumption state.

13. The method of claim 9 including allocating memory usage to said selected at least one memory component from other memory components of the computing system.

14. The method of claim 9 including receiving a command to restore power consumption by the predetermined amount.

15. A computing system having power consumption control capabilities, said system comprising:
a plurality of processing units;
a plurality of memory components coupled to said plurality of processing units; and
at least one operating system for operating said plurality of processing units, wherein said operating system is operative to control the memory usage of said plurality of processing units among said plurality of memory components in an interleaved manner, said operating system responsive to a command to adjust the power consumption of the computing system by a predetermined amount in response to the command, determine a number of the memory components to be powered down to achieve the predetermined amount of power consumption adjustment, select at least one of the memory components based on the determination and controlling the power consumption of said selected at least one memory component.

16. The system of claim 15 wherein the operating system is responsive to said command to reduce the power consumption of the computing system by a predetermined amount by evacuating the selected at least one memory component of the computing system.

17. The system of claim 16 wherein the operating system is operative to determine at least one memory component of said plurality for reduction of power consumption to meet said predetermined amount of reduced power consumption with a minimum of operational impact on the computing system.

18. The system of claim 15 wherein the operating system is responsive to said command to restore the power consumption of the computing system by a predetermined amount by allocating memory usage to the selected at least one memory component of the computing system.

19. The system of claim 18 wherein the operating system allocates memory usage to the selected at least one memory component from unselected memory components of the computing system.

20. The system of claim 18 wherein the operating system is operative to determine at least one memory component of said plurality for an increase of power consumption to meet said predetermined amount of power consumption restoration.

* * * * *